United States Patent
Smallcomb et al.

(10) Patent No.: US 7,778,335 B2
(45) Date of Patent: Aug. 17, 2010

(54) METHOD AND SYSTEM FOR HIERARCHICAL MODULATION AND DEMODULATION FOR DIGITAL RADIO

(75) Inventors: Joseph Smallcomb, Lake Worth, FL (US); Paul Marko, Pembroke Pines, FL (US)

(73) Assignee: XM Satellite Radio, Inc., Washington, DC (US)

( * ) Notice: Subject to any disclaimer, the term of this patent is extended or adjusted under 35 U.S.C. 154(b) by 1355 days.

(21) Appl. No.: 11/112,658

(22) Filed: Apr. 22, 2005

(65) Prior Publication Data

US 2006/0239365 A1    Oct. 26, 2006

(51) Int. Cl.
    *H04K 1/10* (2006.01)
(52) U.S. Cl. .............. 375/260; 375/211; 375/264; 375/268; 375/261; 375/316; 370/315; 370/316; 370/328; 370/492; 455/3.02; 455/443; 455/63.2; 455/11.1; 455/13.1
(58) Field of Classification Search .......... 370/316, 370/315, 328, 492, 501, 279, 293, 539, 541; 375/211, 212, 214, 260, 261, 264, 268, 316, 375/322, 240.26–240.27; 455/3.02, 427–430, 455/449, 11.1–13.1, 15, 63.2, 7, 11, 12.1–12.3; 342/352, 353; 725/27, 149; 714/751, 752, 714/786
See application file for complete search history.

(56) References Cited

U.S. PATENT DOCUMENTS

| | | | |
|---|---|---|---|
| 6,510,317 B1 * | 1/2003 | Marko et al. | 455/428 |
| 2002/0122481 A1 * | 9/2002 | Mine | 375/240.01 |
| 2005/0111579 A1 * | 5/2005 | Walker et al. | 375/308 |
| 2005/0143004 A1 * | 6/2005 | Dibiaso et al. | 455/12.1 |
| 2006/0056330 A1 * | 3/2006 | Anderson et al. | 370/316 |
| 2007/0011716 A1 * | 1/2007 | Koslov et al. | 725/135 |
| 2007/0025283 A1 | 2/2007 | Koslov | |
| 2007/0054614 A1 | 3/2007 | Walker et al. | |

OTHER PUBLICATIONS

Gledhill et al., "DVB-T Hierarchial Modulation," http://www.dba.org.au/uploads/documents/Hierarchical.pdf.
Schertz et al. "Hierarchical Modulation—the transmission of two independent DVB-T multiplexes on a single frequency," http://www.isat.info/eng/share/index.php?db=share&category=DIGITAL&mode=view&sp=0&id=287.

* cited by examiner

*Primary Examiner*—David C Payne
*Assistant Examiner*—Rahel Guarino
(74) *Attorney, Agent, or Firm*—Kramer Levin Naftalis & Frankel LLP

(57) ABSTRACT

A communication system (10) using hierarchical modulation includes at least one satellite (12 & 13) transmitting a data stream and a hierarchical modulated data stream, and at least one terrestrial station (16) transmitting the data stream and the hierarchical modulated data stream. The communication system can further include at least one receiver (18) for demodulating and combining the data stream from at least one satellite and from at least one terrestrial station and for hierarchically demodulating and combining the hierarchical modulated data stream from at least one satellite and the hierarchical modulated data stream from at least one terrestrial station. The terrestrial station can be a terrestrial repeater repeating the data stream and the hierarchical data stream from at least one satellite. The system can also include an uplink (11) having a hierarchical modulator for modulating both the data stream and the hierarchical data stream.

19 Claims, 5 Drawing Sheets

100

METHOD AND SYSTEM FOR HIERARCHICAL MODULATION AND DEMODULATION FOR DIGITAL RADIO

CROSS-REFERENCE TO RELATED APPLICATIONS (NOT APPLICABLE)

FIELD OF THE INVENTION

The invention relates generally to hierarchical modulation and demodulation, and more particularly to a method and system for hierarchical modulation and demodulation using both satellite and terrestrial systems.

BACKGROUND OF THE INVENTION

Satellite radio operators are providing digital radio broadcast services covering the entire continental United States. These services offer approximately 100 channels, of which nearly 50 channels in a typical configuration provides music with the remaining stations offering news, sports, talk and data channels. Briefly, the service provided by XM Satellite Radio includes a satellite X-band uplink to two satellites which provide frequency translation to the S-band for retransmission to radio receivers on earth within a coverage area. Radio frequency carriers from one of the satellites are also received by terrestrial repeaters. The content received at the repeaters is retransmitted at a different S-band carrier to the same radios that are within their respective coverage areas. These terrestrial repeaters facilitate reliable reception in geographic areas where LOS reception from the satellites is obscured by tall buildings, hills, tunnels and other obstructions. The signals transmitted by the satellites and the repeaters are received by satellite digital audio radio system (SDARS) receivers which can be located in automobiles, in handheld or in stationary units for home or office use. The SDARS receivers are designed to receive one or both of the satellite signals and the signals from the terrestrial repeaters and combine or select one of the signals as the receiver output.

Hierarchical modulation and demodulation is well known in fixed environments such as satellite and terrestrial systems. For example, the Digital Video Broadcasting specification (in Europe) for terrestrial signaling (DVB-T) is a flexible system allowing terrestrial broadcasters to choose from a variety of options to suit their various service environments and generally enables such broadcasters to trade-off bit-rate versus signal robustness.

In hierarchical modulation as described in the DVB-T specification, two separate datastreams are modulated onto a single DVB-T stream. One stream, called the "High Priority" (HP) stream is embedded within a "Low Priority" (LP) stream. Receivers with "good" reception conditions can receive both streams, while those with poorer reception conditions may only receive the "High Priority" stream. Broadcasters can target two different types of DVB-T receivers with two completely different services. Typically, the LP stream is of higher bitrate, but lower robustness than the HP one. For example, a broadcaster could choose to deliver HDTV in the LP stream.

DVB-T is a multi-carrier system using about 2000 or about 8000 carriers, each of which carries QPSK, 16QAM or 64QAM. QAM (Quadrature Amplitude Modulation) is one of the means used to increase the amount of information per modulation symbol. Taking the example of 64QAM, a hierarchical system can map data onto 64QAM in such a way that there is effectively a QPSK stream buried within the 64QAM stream. Further, the spacing between constellation states can be adjusted to protect the QPSK (HP) stream, at the expense of the 64QAM (LP) stream.

In layman's terms, good quality reception allows receivers to resolve the entire 64QAM constellation. In areas with poorer quality reception, or in the case of mobile or portable reception, receivers may only be able to resolve the lighter colored portions of the constellation, which correspond to QPSK. Considering bits and bytes, in a 64QAM constellation you can code 6 bits per 64QAM symbol. In hierarchical modulation, the 2 most significant bits (MSB) would be used for the robust mobile service, while the remaining 6 bits would contain, for example, a HDTV service. The first two MSBs correspond to a QPSK service embedded in the 64QAM one. To date, no existing system is known to have combined hierarchical data streams from both a satellite data stream and a terrestrial data stream and certainly not for digital audio radio systems.

SUMMARY OF THE INVENTION

In a first embodiment in accordance with the present invention, a communication system using hierarchical modulation can include at least one satellite transmitting a data stream and a hierarchical modulated data stream, and at least one terrestrial station transmitting the data stream and the hierarchical modulated data stream. The communication system can further include at least one receiver for demodulating and combining the data stream from at least one satellite and from at least one terrestrial station and for hierarchically demodulating and combining the hierarchical modulated data stream from at least one satellite and the hierarchical modulated data stream from at least one terrestrial station. In a system such as a satellite digital audio radio system, the communication system can include two or more satellites and one or more terrestrial repeaters repeating the data stream and the hierarchical data stream from the at least one satellite. The terrestrial repeater can include a down converter coupled to a satellite demodulator coupled to hierarchical demodulator, a hierarchical transcoder, a terrestrial hierarchical modulator, and an up converter. The communication system can also include an uplink having a forward error correction encoder for the data stream and a forward error correction encoder for the hierarchical data stream, a hierarchical modulator for modulating both the data stream and the hierarchical data stream, and an up-converter coupled to the hierarchical modulator.

In a second embodiment, a digital receiver such as a satellite digital audio radio receiver can include a first demodulator for demodulating at least one satellite signal to provide a demodulated satellite signal, at least a second demodulator for demodulating at least one terrestrial signal to provide a demodulated terrestrial signal, and a hierarchical processor. The hierarchical processor performs hierarchical demodulation of at least one among the demodulated satellite signal and the at least one satellite signal and for hierarchical demodulation of at least one among the demodulated terrestrial signal and the at least one terrestrial signal to provide a hierarchical demodulated satellite signal and a hierarchical demodulated terrestrial signal respectively. The digital receiver can further include a down converter for down converting the at least one satellite signal and terrestrial signal and can further include a forward error correction decoder. The digital receiver can optionally include a combiner for combining the demodulated satellite signal and the demodulated terrestrial signal. The digital receiver can include another combiner for combining the hierarchical demodulated satellite signal and the hierarchical demodulated terrestrial signal.

In a third embodiment, a method of demodulating hierarchical encoded signals can include the steps of demodulating at least one satellite signal to provide a demodulated satellite signal, demodulating at least one terrestrial signal to provide a demodulated terrestrial signal, hierarchically demodulating at least one among the demodulated satellite signal and the at least one satellite signal to provide a hierarchical demodulated satellite signal, and hierarchically demodulating at least one among the demodulated terrestrial signal and the at least one terrestrial signal to provide a hierarchical demodulated terrestrial signal respectively. The method can further include the steps of down-converting the at least one satellite signal and the at least one terrestrial signal, forward error correcting at least one among the hierarchical demodulated satellite signal and the hierarchical demodulated terrestrial signal, and combining signals such as combining the demodulated satellite signal and the demodulated terrestrial signal and/or combining the hierarchical demodulated satellite signal and the hierarchical demodulated terrestrial signal. Note, the step of demodulating and hierarchically demodulating can occur serially or in parallel (or simultaneously). The method can further include the steps of outputting data extracted from the demodulated satellite signal and the demodulated terrestrial to a first device and outputting data extracted from the hierarchically demodulated satellite signal and the hierarchically demodulated terrestrial signal to a second device.

DETAILED DESCRIPTION OF THE DRAWINGS

Figure 1:
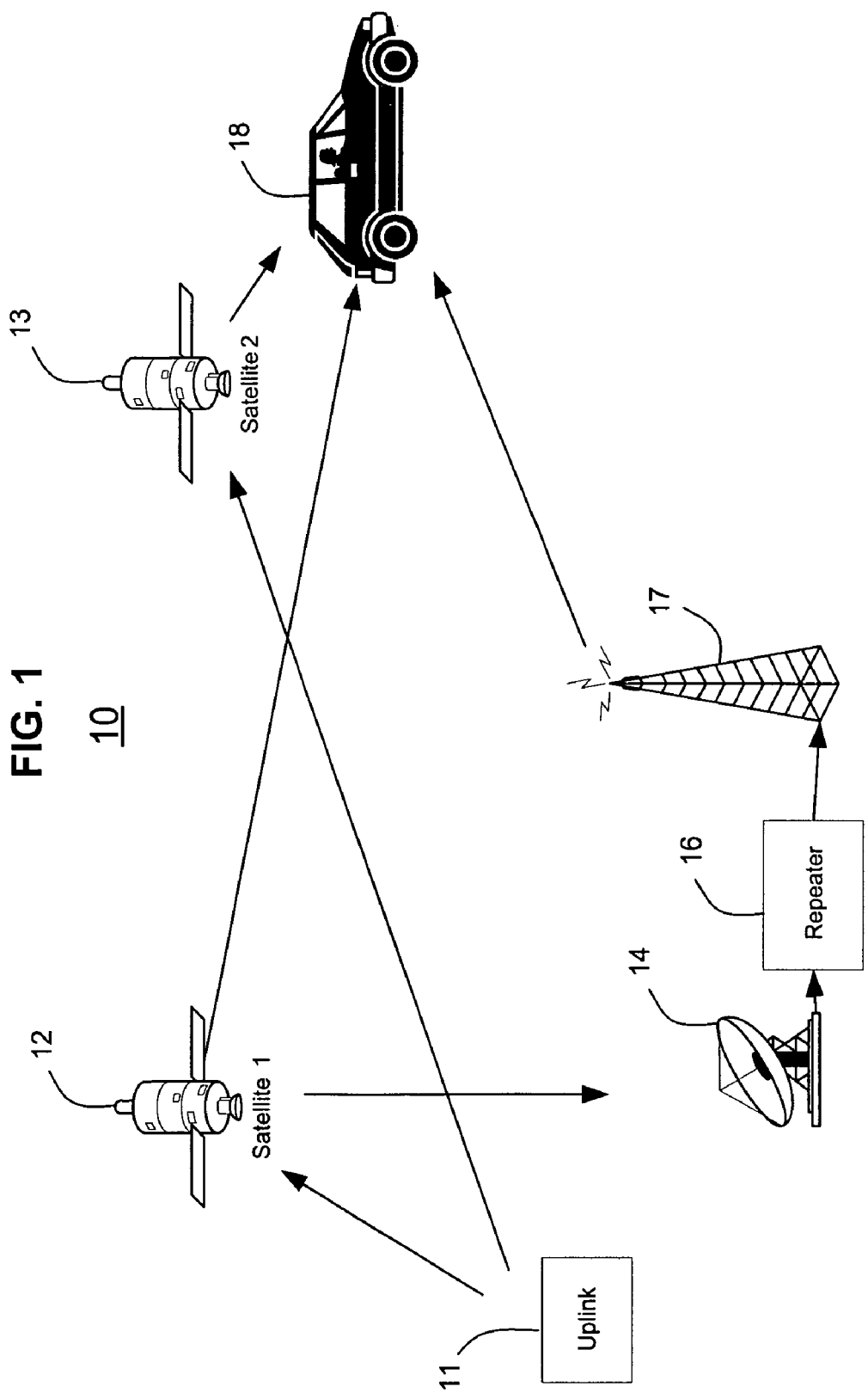
FIG. 1 is a block diagram of a satellite digital audio radio receiver system that can use a hierarchical modulation and demodulation scheme in accordance with an embodiment of the present invention.

Referring to FIG. 1, a satellite digital audio radio system 10 is shown having a plurality of satellites 12 and 13 and a network of terrestrial repeaters 16 (only one is shown for simplicity) similar to an existing system operated by XM Satellite Radio. The system further includes an uplink 11 providing a standard (or main) data stream and a hierarchically encoded data stream in a combined data stream as further detailed in FIG. 2. In this particular embodiment, the uplink 11 provides the combined data stream to at least one satellite (12 and 13). The satellites 12 and 13 transmit their signal to a plurality of subscribers 18 (again, only one shown for simplicity) that can be in the form of mobile or fixed receivers as will be further detailed with respect to FIG. 4.

In this particular embodiment, radio frequency carriers from one of the satellites (12) are also received by terrestrial repeaters 16 via receive antennas 14. The content received at the repeaters is retransmitted at a different S-band carrier to the same radios or subscribers that are within their respective coverage areas via transmit antennas 17. As discussed above, these terrestrial repeaters facilitate reliable reception in geographic areas where LOS reception from the satellites is obscured by tall buildings, hills, tunnels and other obstructions. The SDARS receivers herein are designed to receive one or both of the satellite signals and the signals from the terrestrial repeaters and combine or select one of the signals as the receiver output.

Figure 2:
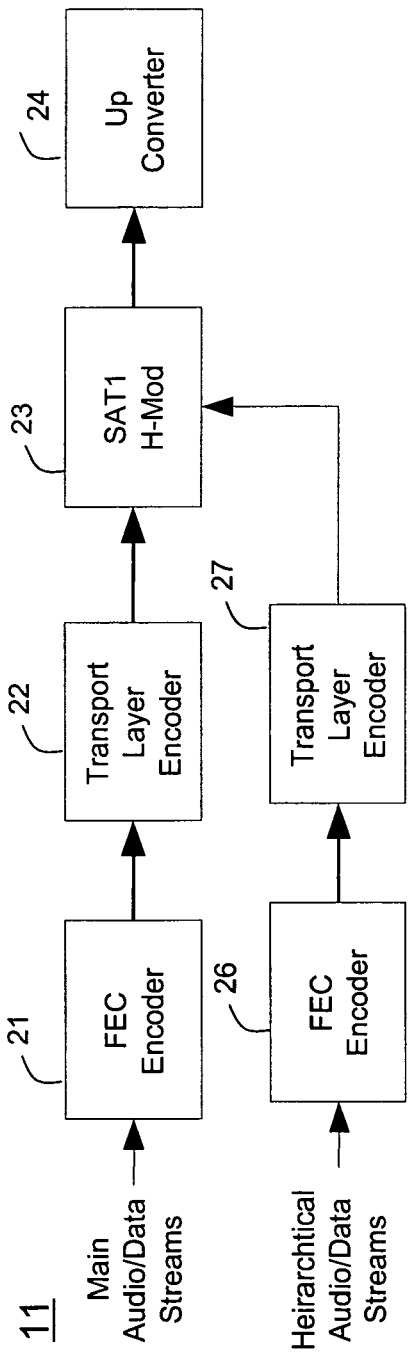
FIG. 2 is a block diagram of a satellite uplink using hierarchical modulation in accordance with an embodiment of the present invention.
Figure 5:
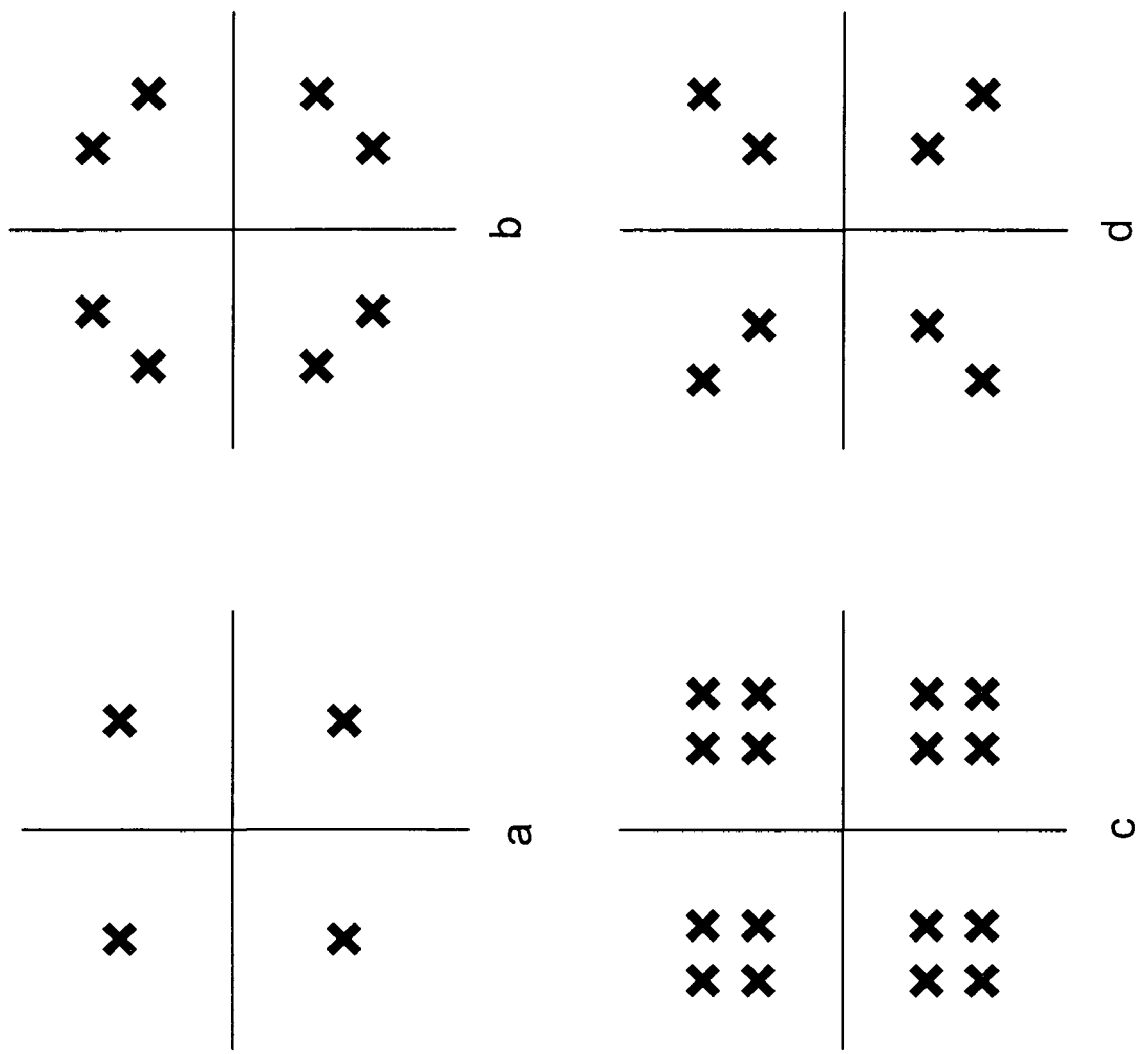
FIG. 5 is an illustration of different forms of hierarchical modulation in accordance with an embodiment the present invention.

Referring to FIG. 2, a block diagram of the satellite uplink 11 includes components for encoding a main or standard audio and/or data stream and a components for encoding a hierarchical audio and/or data stream. In this regard, the main data stream is FEC encoded using FEC encoder 21 and further encoded using transport layer encoder 22. Likewise, the hierarchical data stream is encoded using FEC encoder 26 and further encoded using transport layer encoder 27. Both streams are then hierarchically modulated using the hierarchical modulator 23 before being up-converted by up-converter 24 and transmitted to the satellites 12 and 13. The type of hierarchical encoding that can be used is not limited to any particular modulation scheme. Some examples of Hierarchical modulation (H-Mod) schemes on a QPSK waveform are shown in FIG. 5 where a) illustrates: No H-MOD, b) PSK H-MOD, c) QAM H-MOD, d) ASK H-MOD. Other modulation schemes that can overlay data over a main data stream is certainly contemplated within the scope of the embodiments of the invention herein.

Figure 3:
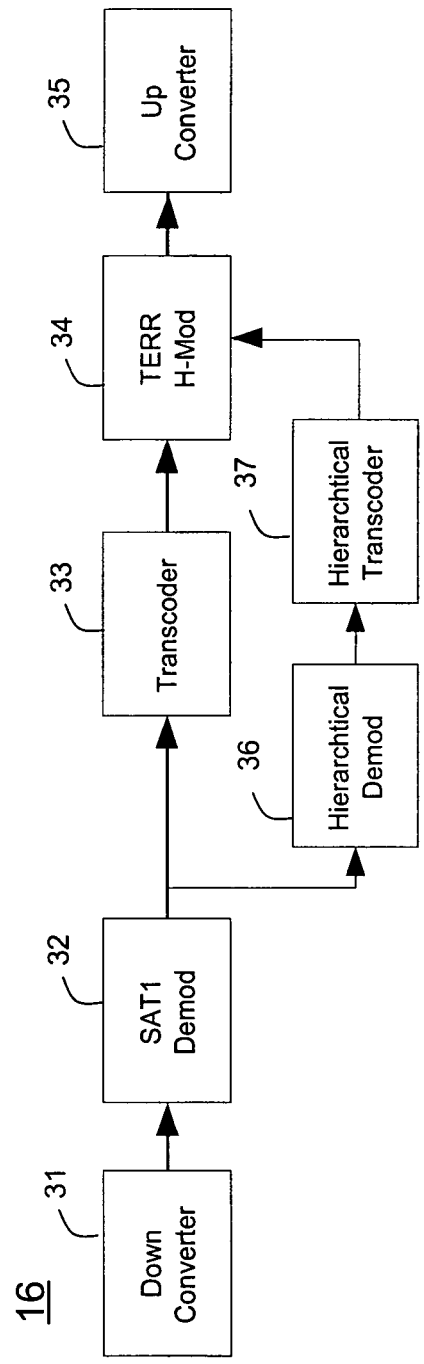
FIG. 3 is a block diagram of a terrestrial repeater using a hierarchical transcoder in accordance with an embodiment of the present invention.

Referring to FIG. 3, a block diagram of the repeater 16 can include a down converter 31 for down converting the up-converted hierarchical modulated signal from satellite 11. The repeater 16 can further include a demodulator 32 that provides a data stream output to a transcoder 33 and another data stream to a hierarchical demodulator 36 and hierarchical transcoder 37. The hierarchical transcoder 37 takes the Hierarchical modulated data from the satellite signal, FEC decodes the data and FEC encodes the data for a terrestrial hierarchical modulator 34. The terrestrial hierarchical modulator 34 also receives the transcoded data from transcoder 33. The signal from the modulator 34 is then up-converted using up-converter 35 which transmits hierarchically modulated data on the main terrestrial (OFDM) waveform for reception by any of the subscriber units 18 within its range.

Figure 4:
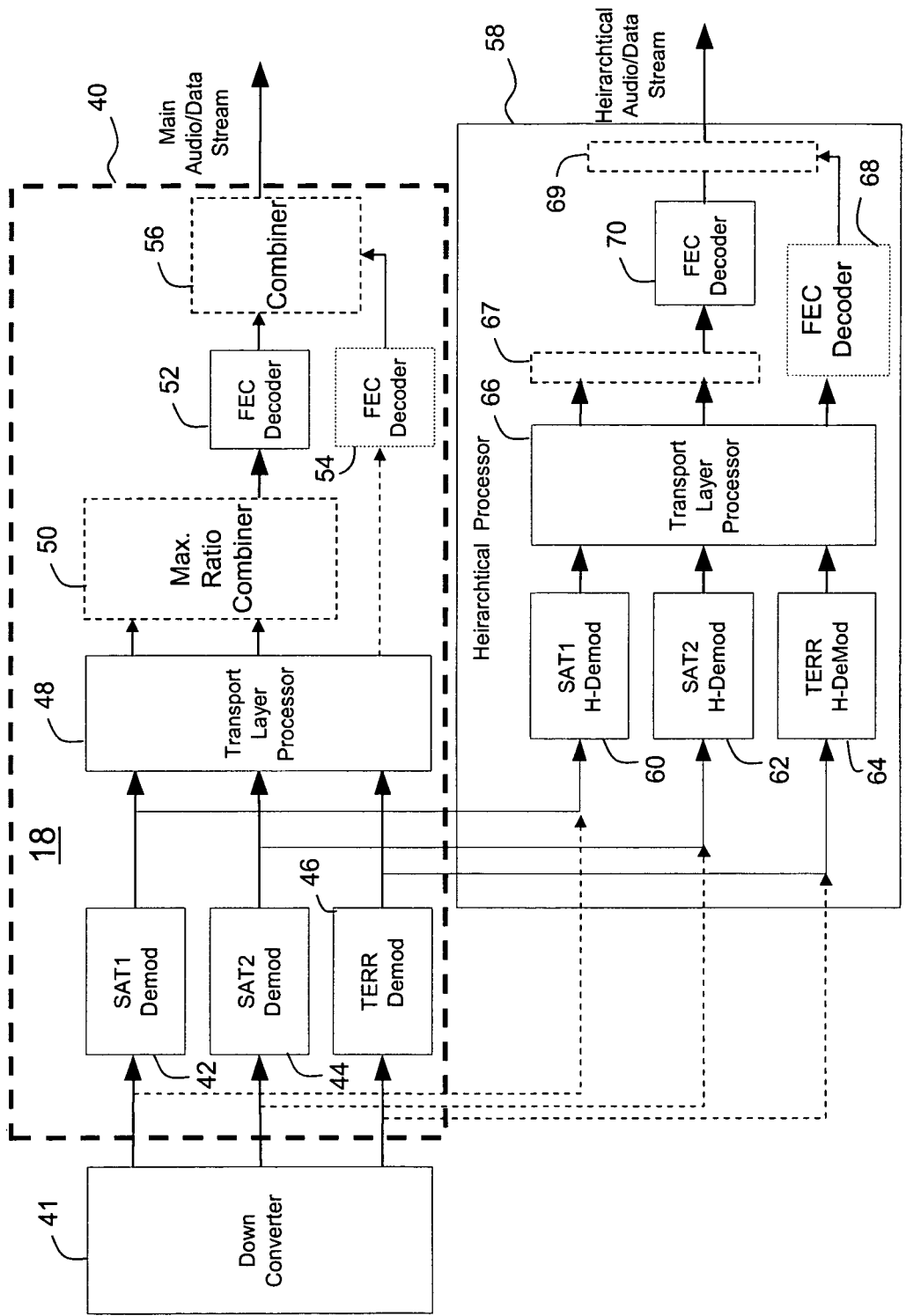
FIG. 4 is a block diagram of a satellite digital audio radio receiver using hierarchical demodulation in accordance with an embodiment of the present invention.

Referring to FIG. 4, a block diagram of a receiver or subscriber unit 18 can operationally receive two satellite and terrestrial signals, and also demodulate and separate the main and hierarchical data streams. For both the main and hierarchical data streams, the two satellite and terrestrial streams can be combined (maximal ratio combining) before and/or after FEC decoding to minimize errors. Note, the combining can be done using maximal ratio combining (before the FEC decoder) or selective combining (after the FEC decoder). Also note, the inner FEC codes for the three streams can be complimentary codes as currently used on the existing XM satellite radio system.

In the specific embodiment shown in FIG. 4, the receiver 18 can include a down converter 41 for down converting the satellite signal. In existing XM Satellite Radio technology, a non-hierarchically modulated receiver system 40 can typically include a first satellite signal demodulator 42, a second satellite signal demodulator 44, and a terrestrial signal demodulator 46 that would be further processed by a transport layer processor 48 before optionally combining the satellite signals using a maximal ratio combiner 50 and/or combining the satellite signals with the terrestrial signal using another combiner (selective combiner) 56. Note, the receiver unit 18 can further include a FEC decoder 52 after the combiner 50 for forward error correcting the satellite signals and can optionally include a FEC decoder 54 for forward error correcting the terrestrial signal before combining with the satellite signals at the combiner 56.

Additionally, in accordance with an embodiment of the present invention, the receiver unit 18 can further include a hierarchical processor 58 that can optionally process the received satellite signal in parallel (see dashed lines) or substantially in parallel with the processing of the main audio/data stream. In particular, the hierarchical processor can hierarchically demodulate signals either before or after demodulation by demodulators 42, 44, and 46 using hierarchical demodulators 60 and 62 for the satellite signals and hierarchical demodulator 64 for the terrestrial signal. The hierarchically demodulated signals from demodulators 60, 62, and 64 can be further processed by a transport layer processor 66 before optionally combining the satellite signals using a maximal ratio combiner 67 and/or combining the satellite signals with the terrestrial signal using another combiner (selective combiner) 69. Note, the receiver unit 18 can further include a FEC decoder 70 after the combiner 67 for forward error correcting the satellite signals and can optionally include a FEC decoder 68 for forward error correcting the terrestrial signal before combining with the satellite signals at the combiner 69. Once the main audio/data stream and the hierarchical audio/data streams are processed, they can be provided to separate output sources if desired. For instance, in the example of a satellite radio, the main audio/data stream can be recorded while the hierarchical audio/data stream can be provided to a display for viewing traffic or weather data.

Figure 6:
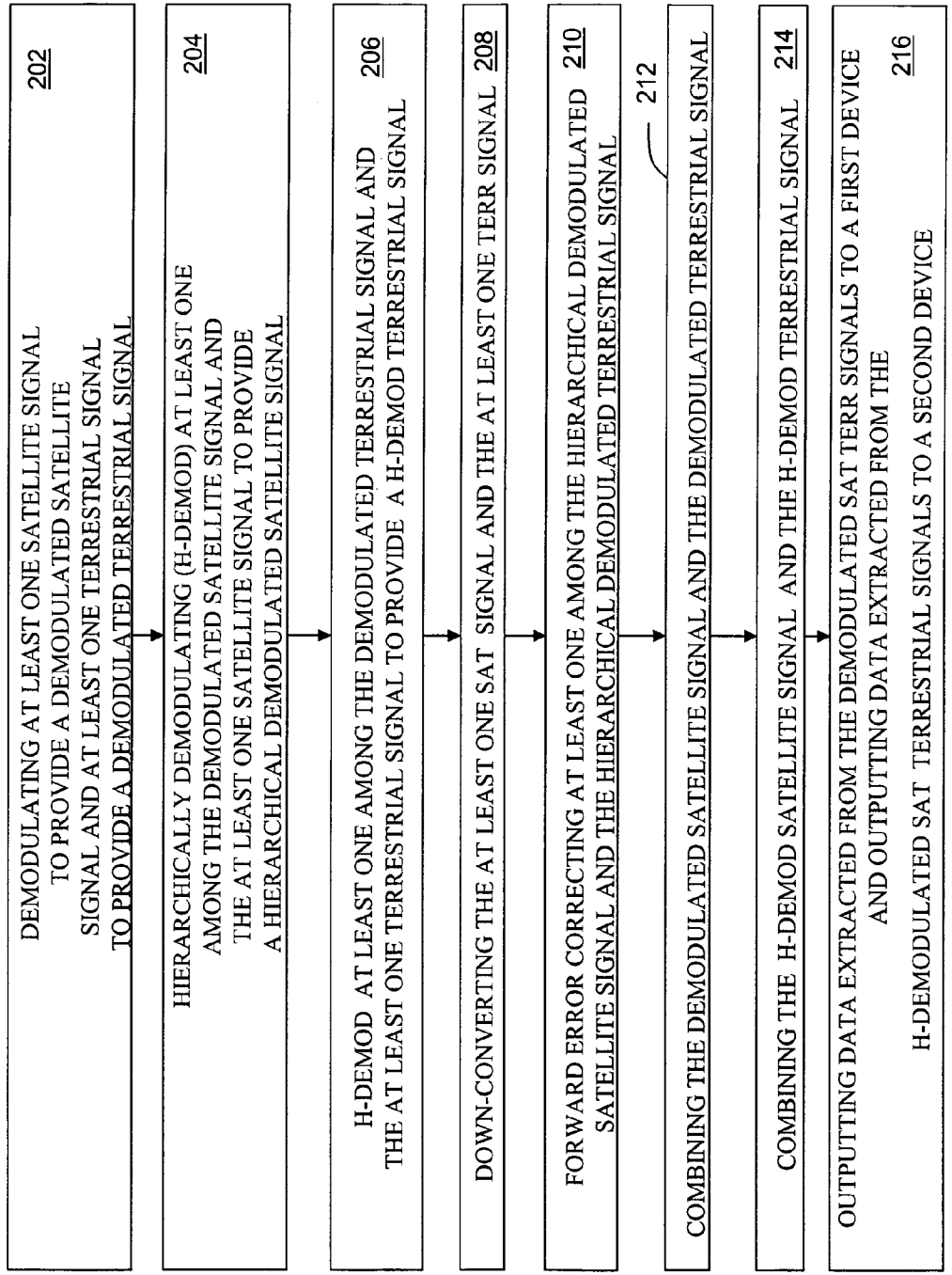
FIG. 6 is a flowchart illustrating a method in accordance with an embodiment of the present invention.

Referring to FIG. 6, a method 200 of demodulating hierarchical encoded signals can include the steps of demodulating at least one satellite signal to provide a demodulated satellite signal and demodulating at least one terrestrial signal to provide a demodulated terrestrial signal at step 202, hierarchically demodulating at step 204 at least one among the demodulated satellite signal and the at least one satellite signal to provide a hierarchical demodulated satellite signal, and hierarchically demodulating at step 206 at least one among the demodulated terrestrial signal and the at least one terrestrial signal to provide a hierarchical demodulated terrestrial signal. The method 200 can further include the steps of down-converting the at least one satellite signal and the at least one terrestrial signal at step 208, forward error correcting at least one among the hierarchical demodulated satellite signal and the hierarchical demodulated terrestrial signal at step 210, and combining signals such as combining the demodulated satellite signal and the demodulated terrestrial signal at step 212 and/or combining the hierarchical demodulated satellite signal and the hierarchical demodulated terrestrial signal at step 214. Note, the step of demodulating and hierarchically demodulating can occur serially or in parallel (or simultaneously). The method 200 can further include the steps 216 of outputting data extracted from the demodulated satellite signal and the demodulated terrestrial to a first device and outputting data extracted from the hierarchically demodulated satellite signal and the hierarchically demodulated terrestrial signal to a second device.

The description above is intended by way of example only and is not intended to limit the embodiments of the present invention in any way except as set forth in the appended claims. For example, although the example above is described with reference to a satellite digital audio radio system, the systems, methods and techniques herein can equally be applied to a satellite television broadcasting system using terrestrial repeaters.

We claim:

1. A communication system using hierarchical modulation, comprising:
   at least one satellite transmitting a data stream and a hierarchically modulated data stream;
   at least one terrestrial repeater station transmitting the data stream and the hierarchically modulated data stream, wherein the terrestrial repeater station comprises a down converter coupled to a satellite demodulator coupled to hierarchical demodulator, a hierarchical transcoder, a terrestrial hierarchical modulator, and an up converter;
   at least one receiver for demodulating and combining the data stream from the at least one satellite and from the at least one terrestrial station and for hierarchically demodulating and combining the hierarchically modulated data stream from the at least one satellite and the hierarchically modulated data stream from the at least one terrestrial station; and
   an uplink having a forward error correction encoder for the data stream and a forward error correction encoder for the hierarchical data stream, a hierarchical modulator for modulating both the data stream and the hierarchical data stream, and an up-converter coupled to the hierarchical modulator,
   wherein the demodulated combined data stream output from the receiver comprises audio data, and the hierarchically demodulated combined data stream output from the receiver comprises text or image data.

2. The communication system of claim 1, wherein the at least one satellite comprises two satellites.

3. The communication system of claim 1, wherein the at least one terrestrial station is a terrestrial repeater repeating the data stream and the hierarchical data stream from the at least one satellite.

4. The system of claim 1, wherein the combined data stream output from the receiver is sent to at least one of a recording device and a speaker, and the hierarchically demodulated combined data stream output from the receiver is sent to a display.

5. A digital receiver, comprising:
   a first demodulator for demodulating at least one satellite signal to provide a demodulated satellite signal;
   at least a second demodulator for demodulating at least one terrestrial signal to provide a demodulated terrestrial signal; and
   a hierarchical processor for hierarchical demodulation of at least one among the demodulated satellite signal and the at least one satellite signal and for hierarchical demodulation of at least one among the demodulated terrestrial signal and the at least one terrestrial signal to provide a hierarchically demodulated satellite signal and a hierarchically demodulated terrestrial signal respectively that are substantially processed in parallel with the processing of the at least one satellite signal by the first demodulator and the processing of the at least one terrestrial signal by the second demodulator,
   wherein the hierarchical processor further comprises at least one forward error decoder, a maximal ratio combiner, and a selective combiner for combining the hierarchical demodulated satellite signal with the hierarchical demodulated terrestrial signal, and
   wherein the demodulated combined data stream output from the receiver comprises audio data, and the hierarchically demodulated combined data stream output from the receiver comprises text or image data.

6. The digital receiver of claim 5, wherein the digital receiver further comprises a down converter for down converting the at least one satellite signal and at least one terrestrial signal.

7. The digital receiver of claim 5, wherein the digital receiver further comprises a combiner for combining the demodulated satellite signal and the demodulated terrestrial signal.

8. The digital receiver of claim 5, wherein the digital receiver further comprises a combiner for combining the hierarchical demodulated satellite signal and the hierarchical demodulated terrestrial signal.

9. The digital receiver of claim 5, wherein the digital receiver further comprises at least one forward error detection decoder.

10. The digital receiver of claim 5, wherein the digital receiver is a satellite digital audio receiver.

11. The digital receiver of claim 5, wherein the combined data stream output from the receiver is sent to at least one of a recording device and a speaker, and the hierarchically demodulated combined data stream output from the receiver is sent to a display.

12. A method of demodulating hierarchically encoded signals, comprising the steps of:
    demodulating at least one satellite signal to provide a demodulated satellite signal;
    demodulating at least one terrestrial signal to provide a demodulated terrestrial signal;
    hierarchically demodulating at least one among the demodulated satellite signal and the at least one satellite signal to provide a hierarchical demodulated satellite signal;
    hierarchically demodulating at least one among the demodulated terrestrial signal and the at least one terrestrial signal to provide a hierarchical demodulated terrestrial signal respectively;
    wherein the hierarchical demodulated satellite signal and the hierarchical demodulated terrestrial signal are substantially processed in parallel with the processing of the at least one satellite signal and the at least one terrestrial signal;
    wherein the at least one satellite signal is received via an uplink having a forward error correction encoder for the data stream and a forward error correction encoder for the hierarchical data stream, a hierarchical modulator for modulating both the data stream and the hierarchical data stream, and an up-converter is coupled to the hierarchical modulator, and
    wherein the demodulated combined data stream output from the receiver comprises audio data, and the hierarchically demodulated combined data stream output from the receiver comprises text or image data.

13. The method of claim 12, wherein the method further comprises the step of down-converting the at least one satellite signal and the at least one terrestrial signal.

14. The method of claim 12, wherein the method further comprises the step of combining the demodulated satellite signal and the demodulated terrestrial signal.

15. The method of claim 12, wherein the method further comprises the step of combining the hierarchical demodulated satellite signal and the hierarchical demodulated terrestrial signal.

16. The method of claim 12, wherein the method further comprises the step of forward error correcting at least one among the hierarchically demodulated satellite signal and the hierarchical demodulated terrestrial signal.

17. The method of claim 12, wherein the steps of demodulating and hierarchically demodulating occur simultaneously.

18. The method of claim 12, wherein the method further comprises the steps of outputting data extracted from the demodulated satellite signal and the demodulated terrestrial signal to a first device and outputting data extracted from the hierarchically demodulated satellite signal and the hierarchically demodulated terrestrial signal to a second device.

19. The method of claim 12, wherein the combined data stream output from the receiver is sent to at least one of a recording device and a speaker, and the hierarchically demodulated combined data stream output from the receiver is sent to a display.

* * * * *